Figure 1:
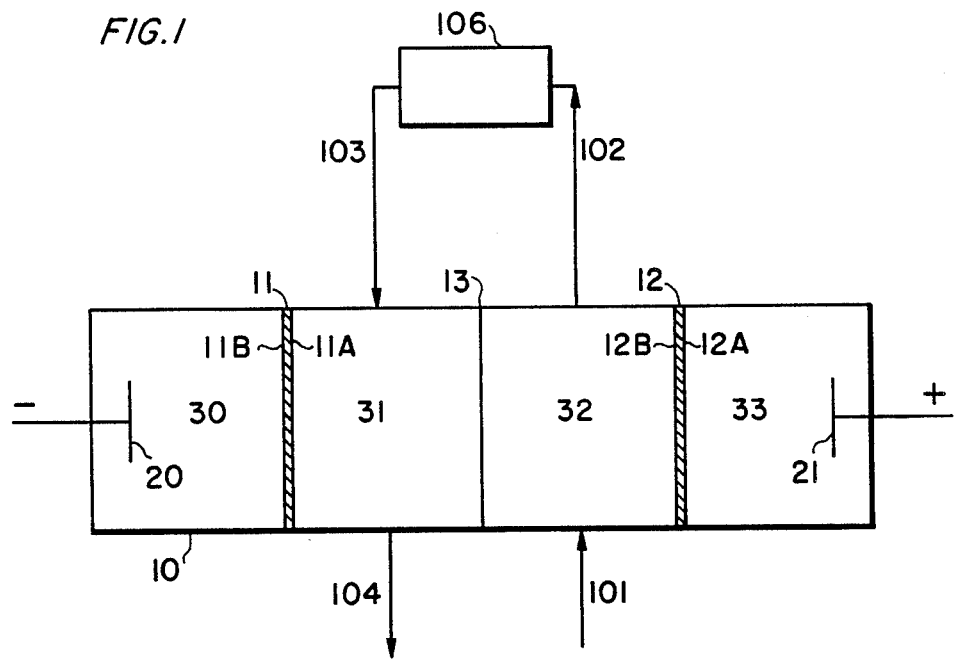

United States Patent [19]

Hatzidimitriu

[11] Patent Number: 4,938,856
[45] Date of Patent: Jul. 3, 1990

[54] PROCESS FOR MILD HEAT TREATMENT OF A FLOWABLE FLUID

[75] Inventor: Stratos E. Hatzidimitriu, San Jose, Calif.

[73] Assignee: FMC Corporation, Philadelphia, Pa.

[21] Appl. No.: 317,510

[22] Filed: Mar. 1, 1989

[51] Int. Cl.$^5$ .......................... A23L 2/22; C25B 3/00
[52] U.S. Cl. .................................. 204/182.3; 204/131; 204/182.6; 426/239
[58] Field of Search ............... 204/182.4, 182.6, 182.9, 204/182.3; 426/239, 244, 521

[56] References Cited

U.S. PATENT DOCUMENTS

| | | | |
|---|---|---|---|
| 512,133 | 1/1894 | Vander Weyde et al. | |
| 751,179 | 2/1904 | Kollrepp et al. | |
| 1,256,758 | 2/1918 | Williams | |
| 1,915,568 | 8/1928 | Gortner et al. | |
| 1,972,561 | 3/1932 | Heubaum | 204/1 |
| 2,089,116 | 8/1937 | Dyckerhoff | 99/69 |
| 2,159,074 | 5/1939 | Briggs | 204/34 |
| 2,631,100 | 3/1953 | Aten et al. | 99/57 |
| 2,671,055 | 3/1954 | Aten et al. | 204/131 |
| 2,688,572 | 9/1954 | Warshaw | 127/54 |
| 2,830,905 | 4/1958 | Block et al. | 99/54 |
| 3,165,415 | 1/1965 | Kilburn et al. | 99/105 |
| 3,201,245 | 8/1965 | Clark et al. | 99/57 |
| 3,290,173 | 12/1966 | Marino | 127/63 |
| 3,369,906 | 2/1968 | Chen | 99/77 |
| 3,433,726 | 3/1969 | Parsi et al. | 204/180 |
| 3,447,930 | 6/1969 | Francis | 99/57 |
| 3,475,216 | 10/1969 | Walon | 127/46 |
| 3,547,657 | 12/1970 | Otsuka et al. | 99/111 |
| 3,666,647 | 5/1972 | Kubo et al. | 204/180 P |
| 3,687,682 | 8/1972 | Scheder | 99/57 |
| 3,709,802 | 1/1973 | Okuhara et al. | 204/137 R |
| 3,781,174 | 12/1973 | Nishijima et al. | 127/46 A |
| 3,845,226 | 10/1974 | Goujard | 426/239 |
| 3,865,960 | 2/1975 | Wucherpfennig et al. | 426/239 |
| 3,968,017 | 7/1976 | Canata et al. | 204/180 P |
| 4,138,501 | 2/1979 | Chaveron et al. | 426/329 |
| 4,160,713 | 7/1979 | Matsuzaki et al. | 204/180 P |
| 4,212,891 | 7/1980 | Fujita et al. | 426/321 |
| 4,264,631 | 4/1981 | Rose | 426/247 |
| 4,276,140 | 6/1981 | Jain | 204/182.4 |
| 4,317,841 | 3/1982 | Brambilla et al. | 426/329 |
| 4,322,448 | 3/1982 | Matsuura et al. | 426/490 |
| 4,374,714 | 2/1983 | Hekal | 204/131 |
| 4,391,680 | 7/1983 | Mani et al. | 204/182.4 |
| 4,401,678 | 8/1983 | Beaumont | 426/15 |
| 4,492,601 | 1/1985 | Nakasone et al. | 127/48 |
| 4,523,959 | 6/1985 | Exertier | 127/46 |
| 4,539,212 | 9/1985 | Hunter | 426/123 |
| 4,643,902 | 2/1987 | Lawhon et al. | 426/271 |
| 4,670,125 | 6/1987 | Mueller et al. | 204/296 |
| 4,675,202 | 5/1987 | Wenger et al. | 426/521 |
| 4,766,161 | 8/1988 | Chlanda et al. | 521/27 |

OTHER PUBLICATIONS

Fennema, "Principles of Food Science", Food Chemistry, Part I, Marcel Dekker, Inc., New York, 1976, pp. 466–467.

*Primary Examiner*—John F. Niebling
*Assistant Examiner*—Arun S. Phasge
*Attorney, Agent, or Firm*—Richard E. Elden; Alan J. Moore

[57] ABSTRACT

A process is provided for sterilizing or pasturizing aqueous fluids by reducing the pH of a fluid in a first compartment of an electrolytic cell, maintaining the fluid with the reduced pH at a sterilizing temperature for a sufficient time to reduce the concentration of microbial cells in the fluid. The pH sterilized fluid is restored in a second compartment of an electrolytic cell.

5 Claims, 1 Drawing Sheet

PROCESS FOR MILD HEAT TREATMENT OF A FLOWABLE FLUID

A process is provided for inactivating or reducing the concentration of microbial cells and enzymes in a flowable fluid by reducing the pH of the flowable fluid in an electrolytic cell, heating the flowable fluid and subsequently increasing the pH of the flowable fluid in an electrolytic cell to restore the pH of the flowable fluid or to adjust its pH to a desired value.

Acidity is an important factor that can affect processing characteristics, storage stability, and organoleptic attributes of food and other products. Acidity in aqueous fluids is frequently measured by pH, the negative logarithm of the hydrogen ion concentration.

By increasing the acidity (lowering the pH), or decreasing the acidity (increasing the pH), the taste of products can be improved, the viscosity can be modified, the color and protein stability can be enhanced. Acids, such as citric, have been added to some moderately acid fruits and vegetables to lower the pH to a value below 4.5 permitting sterilization to be achieved under less severe thermal conditions than otherwise necessary. However, the reduced pH often adversely affects the taste of food and the stability, color and physical properties of products.

It has been recognized for a long time that the pH of a solution can be changed by electrodialysis, transfer of hydrogen ions or hydroxyl ions through a porous diaphragm. For example, U.S. Pat. No. 751,179 teaches that alkali can be removed from a juice in an anode compartment by electrodialysis. However, the process forms acids at the anode which must be removed by adding lead saccharate, thereby neutralizing the acid formed.

Three compartment electrodialysis cells with the solution to be treated in the intermediate cell with out an electrode avoid the problems of changing the composition of the fluid by oxidation reactions at the anode or reduction reactions at the cathode. However, even when compartments are separated with anion permeable membranes or cation permeable membranes as in U.S. Pat. No. 3,369,906 there is a disadvantage in that ions transferred into the solution from the adjacent compartment are "chemical additives". Further, the process can result in inadvertent contamination from a solution in an adjacent compartment. U.S. Pat. No. 4,317,841 employs chitosan, an amino-bearing polysaccharide, in combination with electrodialysis for adjusting acidity. Such a process while effective for deacidifying coffee is not useful for increasing the acidity (lowering the pH) of a flowable fluid or of a fluid containing suspended matter such as fruit pulp.

U.S. Pat. No. 4,264,631 teaches a process for decreasing the acidity of ground meat chunks by adding salt and electrolyzing the mixture in a cell without separating means. Such a cell will generate chlorine at the anode and hydrogen at the cathode as well as sodium hydroxide.

U.S. Pat. No. 4,643,902 to Lawhon et al. discloses that processes which produce juices suitable for storing involve steps which often detract from their natural desirable characteristics. Aroma and flavor components are easily volatilized at temperatures above 40° C. But producing a juice which can be stored generally requires pasteurization to destroy spoilage microorganisms which can cause complete loss of the product or result in undesirable off-flavors and odors. The patent discloses pasteurization typically employs heating to 62° C. for about 30 minutes, although higher temperatures for shorter periods may be employed. Consequently, volatile flavor and aroma components are lost, detracting from the flavor and aroma of the juice.

In addition, fruits and vegetables contain enzymes which can cause off-flavors, off-aromas, loss of color or other undesirable characteristics. Many fruits and vegetables contain pectinesterase, an enzyme which if not activated will cause the loss of the desirable body and cloud provided by pectin. Thus, the juice is heated to inactivate the pectinesterase if the juice is of the type where "cloud" is desired. Disadvantageously, the temperatures required to inactivate pectinesterase are higher than the temperatures required for pasteurization, ranging from approximately 80° C. to 98° C. Consequently, the loss of flavor and aroma components is further compounded.

The '902 patent to Lawhon et al. teaches separating juices by ultrafiltration to form a sterile permeate serum and a retentate. The retentate is treated to inactivate spoilage microorganisms and subsequently recombined with the permeate. Optionally the retentate may be treated with ion exchange resin to reduce the acidity. The patent reduces, but does not avoid, flavor loss by only pasturizing the retentate part.

The present invention overcomes the need for processing a flowable fluid at a high temperature or for an extended time of the prior processes by providing a process for inactivating microbial cells and enzymes in an aqueous flowable fluid comprising the steps of:

a. introducing a flowable fluid into a first, more electropositive, intermediate compartment of an electrolytic cell wherein the pH of the flowable fluid is reduced, b. withdrawing flowable fluid from the first intermediate cell and maintaining the flowable fluid at a sufficient temperature for a sufficient time to inactivate at least part of the microbial cells and enzymes, c. introducing flowable fluid from step (b) into a second, more electronegative, intermediate compartment of the electrolytic cell wherein the pH of the flowable fluid is increased, said electrolytic cell comprising an anode in an anode compartment, a cathode in a cathode compartment and at least one pair of intermediate compartments, the first intermediate compartment of a pair being defined by a first bipolar membrane proximal to the anode, said bipolar membrane having an anion permeable surface and a cation permeable surface, and a cation selective membrane distal to the anode, and the second intermediate compartment of said pair being defined by the cation selective membrane and a second bipolar membrane proximal to the cathode, the membranes being aligned such that the anion permeable surface of each bipolar membrane is proximal to the anode, and d. inducing a direct current to flow through the cell by applying a voltage between the anode and the cathode, said voltage being sufficient to urge cations through the cation selective membrane and to incorporate hydrogen ions into the flowable fluid on the more electronegative side of the bipolar electrode, and to incorporate hydroxyl ions into the flowable fluid on the more electropositive side of the bipolar membrane.

Bipolar membranes are known to be useful for their ability to rectify alternating current, to improve desalination processes, to act as analogs of certain biological membranes, and to split water in the electrodialysis of acids and bases from salts. Bipolar membranes prepared by various procedures have been reported in the literature. For example, bipolar membranes have been prepared by adhering together two membranes consisting of oppositely charged ion exchange resins in an inert matrix by means of heat and pressure or by means of an adhesive paste (U.S. Pat. No. 2,829,905). Anion and cation exchange membranes have also been fused together by means of heat and pressure to form bipolar membranes as disclosed in U.S. Pat. No. 3,372,101.

A bipolar membrane acts as a barrier to both cations and anions, but when subjected to sufficient electric potential dissociates water into hydrogen ions which are incorporated into the solution on the more electronegative side of the membrane from the cation permeable surface and into hydroxyl ions which are incorporated into the solution on the more electropositive side of the membrane. Therefore, the bipolar membrane does not transport ions from one electrolyte into the solution to be treated, but incorporates either hydrogen ions or hydroxyl ions into the solution to be treated by dissociating the water therein.

The present invention has an added advantage in that cations are transported from the solution in the first intermediate compartment, thus reducing the tendency for deposits to form on heat exchanger surfaces in the subsequent step in which microbial cells are inactivated. However, these cations are restored to the solution in the second intermediate compartment. Consequently, the chemical composition of flowable fluid is usually exactly the same after treatment as before treatment.

The pH of the flowable fluid withdrawn from the first intermediate compartment can be reduced to any desired amount to obtain the desired degree of interactivation of microbial cells ("D value") at any convenient combination of time and temperature. One skilled in the art will readily be able to select these conditions from well known sources, such as the Sterilization Standards Committee of the Association for the Advancement of Medical Instrumentation for flowable fluids to be used in medical applications. Desirably, the pH will be reduced to between 2 and 4.5 for pasturizing or preserving comestibles. Typical temperatures in the range of 62° C. to 150° C. may be employed as recommended in the authoritative sources.

For the purpose of this invention a flowable fluid can be urged to flow through conduit means and can conduct an electrical current, by transfer of ions when subjected to an electric potential gradient, the flowable fluid electrolyte may contain solids, colloids, gases and the like and may have a very high viscosity. A flowable fluid for the purpose of this invention is an aqueous electrolyte, or an aqueous fluid which can conduct direct current by movement of ions and can be urged to flow through conduits and the like. A flowable fluid may contain solids or fibers and cell fragments such as pulp in a fruit juice. Other exemplary flowable fluids include vegetable juices and pastes, wine, sauces, foods with liquified meats or vegetables, pharmaceutical emulsions, mineral slurries and the like.

The best mode of practicing the invention will be understood by one skilled in the art by reference to FIG. 1.

FIG. 1 shows an embodiment of the invention employing a cell containing a single pair of intermediate compartments defined by two bipolar membranes and a single cation permeable membrane.

FIG. 1 comprises cell 10 containing bipolar membranes 11 defining cathode compartment 30 containing cathode 20, and bipolar membrane 12 defining anode compartment 33 containing anode 21. Cation selective membrane 13 is located between bipolar membranes 11 and 12 defining two intermediate compartments, compartment 32, the more electropositive compartment and compartment 31, the more electro-negative compartment. The bipolar membranes are aligned so that anion permeable surfaces 12A and 11A are proximal to anode 21 and cation permeable surfaces 11B and 12B are distal to anode 21 (proximal to cathode 20). The cathode and anode compartments both contain an aqueous electrolyte, such as potassium hydroxide, sodium chloride or the like and the intermediate compartment contains a flowable fluid. Intermediate compartment 32 is provided with inlet conduit 101 suitable for introducing a flowable fluid from a source (not shown) and is also provided with outlet conduit 102 directing flowable fluid from compartment 32 to heating means 106. Flowable fluid is directed from heating means 106 through conduit 103 into intermediate compartment 31. Effluent from compartment 31 is directed by conduit 104 to storage means or packaging means (not shown).

In operation flowable fluid is urged through conduit 101 into intermediate compartment 32, and emerges from compartment 32 as effluent where it is directed by conduit means 102 through heating means 106 and subsequently into conduit 103, through intermediate compartment 31 and emerging through conduit 104. Concomitantly, a voltage between anode 21 and cathode 20 from a power source (not shown) urges a flow of electricity through cell 10 by movement of ions in the electrolyte and flowable fluid, by the transfer of cations from the flowable fluid in the intermediate compartment 32 into intermediate compartment 31 through cation permeable membrane 13, and by the dissociation of water from aqueous fluid and/or anolyte in bipolar membrane 12 with hydroxyl ions being transferred by membrane surface 12A into the electrolyte in anode compartment 33 and hydrogen ions being transferred by membrane surface 12B into first intermediate compartment 32 thereby acidifying the flowable fluid contained therein and lowering its pH. Similarly, the flow of electricity between compartment 31 and cathode compartment 30 through bipolar membrane 11 is by dissociation of water into hydrogen ions which are transferred by membrane surface 11B into cathode compartment 30 and hydroxyl ions which are transferred by membrane surface 11A into second intermediate compartment 31.

Concomitantly, effluent from compartment 32 with a reduced pH is directed to heating means 106 where a temperature is maintained for a sufficient time to reduce the concentration of viable microbial cells and inactivate enzymes. The temperature of the flowable fluid is reduced by conventional means (not shown) and directed to compartment 31 where the pH is raised.

As long as the rate of flow of flowable fluid and of electricity is constant, the cation content and pH of the flowable fluid effluent from conduit 104 is identical with feed through conduit 101.

One skilled in the art will recognize that an electrolytic cell may contain a plurality of pairs of intermediate compartments, for example by adding additional cation selective membranes and bipolar membranes between bipolar membrane 11 and cathode 20 or between bipolar membrane 12 and anode 21 thereby defining additional pairs of intermediate compartments. In such an embodiment of the invention flowable fluid could be directed to flow sequentially through a series of intermediate compartments in which the pH would be lowered prior to heating and then through a series of intermediate compartments in which the pH could be restored.

Alternatively, a portion of the flowable fluid could be directed by parallel conduits into alternate intermediate compartments wherein the pH could be lowered and after heating could be directed by parallel conduits into alternate intermediate compartments where the pH could be raised.

One skilled in the art will recognize that the electrolytes in the anode, cathode and electrolyte compartments will act as "concentration cells" and affect the voltage drop between the compartments. Consequently one would desirably select an electrolyte containing ions which would minimize the voltage drop and provide sufficient conductivity of the electrolyte.

What is claimed:

1. Process for inactivating microbial cells and enzymes in a flowable fluid comprising the steps of:
    a. Introducing a flowable fluid into a first, more electropositive, intermediate compartment of an electrolytic cell wherein the pH of the flowable fluid is reduced,
    b. Withdrawing flowable fluid from the first intermediate cell and maintaining said flowable fluid at a sufficient temperature for a sufficient time to inactivate at least part of the microbial cells and enzymes,
    c. Introducing flowable fluid from step (b) into a second, more electronegative, intermediate compartment of the electrolytic cell wherein the pH of the flowable fluid is increased, said electrolytic cell comprising an anode in an anode compartment, a cathode in a cathode compartment and at least one pair of intermediate compartments, the first intermediate compartment of a pair being defined by a first bipolar membrane proximal to the anode, said bipolar membrane having an anion permeable surface and a cation permeable surface, and a cation selective membrane distal to the anode, and the second intermediate compartment of said pair being defined by the cation selective membrane and a second bipolar membrane proximal to the cathode, the membranes being aligned such that the anion permeable surface of each bipolar membrane is proximal to the anode, and
    d. Inducing a direct current to flow through the cell by applying a voltage between the anode and the cathode, said voltage being sufficient to urge cations through the cation selective membrane and to incorporate hydrogen ions into the flowable fluid on the more electronegative side of the bipolar electrode, and to incorporate hydroxyl ions into the flowable fluid on the more electropositive side of the bipolar membrane without transporting ions into or out of the flowable fluid.

2. The process of claim 1 wherein the pH of the flowable fluid is reduced in step (a) to between 2 and 4.5.

3. The process of claim 1 wherein the flowable fluid in step b. is maintained between a temperature of 62° C. and 150° C.

4. The process of claim 1 wherein the cell contains a plurality of pairs of intermediate compartments and the flowable fluid is directed to flow sequentially through a series of intermediate compartments in which the pH is lowered prior to heating and subsequently through a series of intermediate compartments in which the pH is restored.

5. The process of claim 1 wherein the cell contains a plurality of intermediate compartments and a portion of the flowable fluid is directed to flow by parallel conduits into alternate intermediate compartments wherein the pH is lowered prior to heating and subsequently to heating the flowable fluid is directed into alternate intermediate compartments wherein the pH is raised.

* * * * *